United States Patent
Kaneiwa

(10) Patent No.: US 11,919,327 B2
(45) Date of Patent: Mar. 5, 2024

(54) TRANSFER-TYPE DECORATIVE SHEET AND METHOD OF MANUFACTURING TRANSFER-TYPE DECORATIVE SHEET

(71) Applicant: FUJIFILM Corporation, Tokyo (JP)

(72) Inventor: Hideki Kaneiwa, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/487,520

(22) Filed: Sep. 28, 2021

(65) Prior Publication Data
US 2022/0009275 A1 Jan. 13, 2022

Related U.S. Application Data

(63) Continuation of application No. PCT/JP2020/012089, filed on Mar. 18, 2020.

(30) Foreign Application Priority Data

Mar. 29, 2019 (JP) .................. 2019-067784

(51) Int. Cl.
*B44C 1/165* (2006.01)
*B32B 7/06* (2019.01)
(Continued)

(52) U.S. Cl.
CPC ............ *B44C 1/165* (2013.01); *B32B 7/06* (2013.01); *B44C 1/1741* (2013.01); *C09K 19/04* (2013.01);
(Continued)

(58) Field of Classification Search
CPC ......... B44C 1/165; B44C 1/1741; B32B 7/06; G02B 5/23016; G02F 1/133543;
(Continued)

(56) References Cited

U.S. PATENT DOCUMENTS

2003/0174276 A1* 9/2003 Umeya ................ G02B 5/3016
349/194
2006/0008649 A1* 1/2006 Shinichiro ........... G02B 5/3016
428/411.1
(Continued)

FOREIGN PATENT DOCUMENTS

JP 2004-50596 A 2/2004
WO WO 2016/098799 A1 6/2016
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/012089, dated Oct. 14, 2021.
(Continued)

*Primary Examiner* — Ruiyun Zhang
(74) *Attorney, Agent, or Firm* — Birch, Stewart, Kolasch & Birch, LLP

(57) ABSTRACT

Provided are a transfer-type decorative sheet and a method of manufacturing a transfer-type decorative sheet, the transfer-type decorative sheet including a decorative layer that has excellent peelability from a temporary support and excellent glossiness in case of being seen from an oblique direction. The transfer-type decorative sheet includes: a temporary support; an underlayer that is peelable from and disposed on one surface of the temporary support; and a decorative layer that is disposed on the underlayer, in which the decorative layer includes at least one cholesteric liquid crystal layer, the underlayer is a layer that is formed of a composition including a monomer having one or two polymerizable groups, and a water contact angle of the underlayer is 50° or more.

8 Claims, 2 Drawing Sheets

(51) Int. Cl.
    *B44C 1/17*     (2006.01)
    *C09K 19/04*     (2006.01)
    *G02B 5/30*     (2006.01)
    *G02F 1/1335*     (2006.01)

(52) U.S. Cl.
    CPC ..... *G02B 5/3016* (2013.01); *G02F 1/133543* (2021.01); *C09K 2323/00* (2020.08); *C09K 2323/02* (2020.08); *C09K 2323/03* (2020.08)

(58) Field of Classification Search
    CPC ............... C09K 19/04; C09K 2323/00; C09K 2323/02; C09K 2323/03
    USPC ............................................ 428/1.1, 1.2, 1.3
    See application file for complete search history.

(56) References Cited

U.S. PATENT DOCUMENTS

2016/0062016 A1*   3/2016   Lee ..................... C09D 133/14
                                                   522/64
2019/0196245 A1    6/2019   Ichihara et al.
2020/0225387 A1*   7/2020   Ishiguro ................. C08F 20/30

FOREIGN PATENT DOCUMENTS

WO    WO 2018/043678 A1    3/2018
WO    WO-2019073974 A1 *   4/2019   ....... B29D 11/00605

OTHER PUBLICATIONS

International Search Report (Form PCT/ISA/210) for International Application No. PCT/JP2020/012089 dated Jun. 16, 2020.

* cited by examiner

TRANSFER-TYPE DECORATIVE SHEET AND METHOD OF MANUFACTURING TRANSFER-TYPE DECORATIVE SHEET

CROSS-REFERENCE TO RELATED APPLICATIONS

This application is a Continuation of PCT International Application No. PCT/JP2020/012089 filed on Mar. 18, 2020, which claims priority under 35 U.S.C. § 119(a) to Japanese Patent Application No. 2019-067784 filed on Mar. 29, 2019. Each of the above applications is hereby expressly incorporated by reference, in its entirety, into the present application.

BACKGROUND OF THE INVENTION

1. Field of the Invention

The present invention relates to a transfer-type decorative sheet and a method of manufacturing a transfer-type decorative sheet.

2. Description of the Related Art

A cholesteric liquid crystal layer obtained by immobilizing a cholesteric liquid crystalline phase is known as a layer having properties in which at least either right circularly polarized light or left circularly polarized light in a specific wavelength range is selectively reflected. Therefore, the cholesteric liquid crystal layer is used in various applications, and, for example, the use as a decorative sheet is considered.

WO2018/043678A discloses a decorative sheet including a cholesteric liquid crystal layer having predetermined reflection characteristics.

SUMMARY OF THE INVENTION

On the other hand, recently, from the viewpoint of using a decorative sheet to various applications, the decorative sheet is desired to be transferrable. That is, in a transfer-type decorative sheet including a temporary support and a decorative layer disposed on the temporary support, even in a case where the decorative layer is thin, the decorative layer can be transferred to various objects to be bonded and can be widely used for various applications.

The present inventors disposed an undercoat layer and a cholesteric liquid crystal layer on a temporary support as specifically disclosed in WO2018/043678A to evaluate peelability and found that the temporary support has difficulty in peeling and has insufficient peelability.

The decorative layer to be transferred is also required to have excellent glossiness. In particular, in a case where the decorative layer is seen from an oblique direction, excellent glossiness is required.

In consideration of the above-described circumstances, an object of the present invention is to provide a transfer-type decorative sheet including a decorative layer that has excellent peelability from a temporary support and excellent glossiness in case of being seen from an oblique direction.

In addition, another object of the present invention is to provide a method of manufacturing a transfer-type decorative sheet.

The present inventors conducted a thorough investigation in order to achieve the objects and found that the above-described objects can be achieved with the following configuration.

(1) A transfer-type decorative sheet comprising:
a temporary support;
an underlayer that is peelable from and disposed on one surface of the temporary support; and
a decorative layer that is disposed on the underlayer,
in which the decorative layer includes at least one cholesteric liquid crystal layer,
the underlayer is a layer that is formed of a composition including a monomer having one or two polymerizable groups, and
a water contact angle of the underlayer is 500 or more.
(2) The transfer-type decorative sheet according to (1),
in which a content of the monomer having one or two polymerizable groups is 25 mass % or higher with respect to a total mass of monomers in the composition.
(3) The transfer-type decorative sheet according to (1) or (2),
in which the monomer having one or two polymerizable groups has a cyclic structure.
(4) The transfer-type decorative sheet according to (3), in which the cyclic structure is a structure represented by Formula (1) shown below.
(5) The transfer-type decorative sheet according to any one of (1) to (4),
in which a maximum reflectivity of an integral reflection spectrum in a wavelength range of 380 to 780 nm of the decorative layer is 50% or higher, and
a specular reflectivity at a wavelength at which the decorative layer has the maximum reflectivity is 20% or lower.
(6) The transfer-type decorative sheet according to any one of (1) to (5),
in which a half-width of an integral reflection spectrum of the decorative layer is 80 to 250 nm.
(7) The transfer-type decorative sheet according to any one of (1) to (6),
in which the cholesteric liquid crystal layer has a pitch gradient structure that is a structure in which a helical pitch changes in a thickness direction.
(8) The transfer-type decorative sheet according to any one of (1) to (7),
in which a thickness of the decorative layer is 5.0 μm or more.
(9) A method of manufacturing the transfer-type decorative sheet according to any one of (1) to (8), the method comprising:
a step of forming the underlayer on the temporary support; and
a step of forming the decorative layer on the underlayer.

According to the present invention, it is possible to provide a transfer-type decorative sheet including a decorative layer that has excellent peelability from a temporary support and excellent glossiness in case of being seen from an oblique direction.

In addition, according to the present invention, it is possible to provide a method of manufacturing a transfer-type decorative sheet.

DESCRIPTION OF THE PREFERRED EMBODIMENTS

Figure 1:
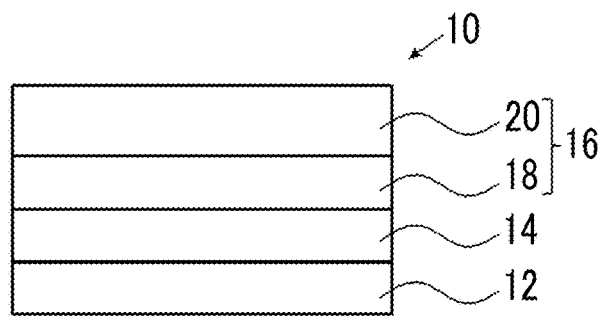
FIG. 1 is a cross-sectional view conceptually showing an example of a transfer-type decorative sheet according to the present invention.

Hereinafter, the details of the present invention will be described.

The following description regarding configuration requirements has been made based on a representative embodiment of the present invention. However, the present invention is not limited to the embodiment.

In the present invention, numerical ranges represented by "to" include numerical values before and after "to" as lower limit values and upper limit values.

In the present invention, using a device in which a large integrating sphere device (ILV-471, manufactured by JASCO Corporation) is attached to a spectrophotometer (V-550, manufactured by JASCO Corporation), an integral reflectivity I-R($\lambda$) at a wavelength $\lambda$ may be measured such that light is incident from a decorative layer surface.

In the present invention, using a device in which an absolute reflectivity measurement device (ARV-474, manufactured by JASCO Corporation) is attached to a spectrophotometer (V-550, manufactured by JASCO Corporation), a specular reflectivity S-R($\lambda$) at the wavelength $\lambda$ at an incidence angle of 5° may be measured such that light is incident from the decorative layer surface.

In the present invention a selective reflection center wavelength of the decorative layer (cholesteric liquid crystal layer) and a half-width in a selective reflection wavelength range may be measured using the following method.

That is, in a case where the integral reflectivity is measured using the above-described method, a spectrum waveform having a peak shape (upward protrusion shape) in which the horizontal axis represents a wavelength is obtained. In this case, an average reflectivity (arithmetic mean) of a maximum value and a minimum value of the integral reflectivity is obtained. Among two wavelengths at two intersections between the waveform and the average reflectivity, in a case where a value of a wavelength on a short wavelength side is represented by $\lambda\alpha$ (nm) and a value of a wavelength on a long wavelength side is represented by $\lambda\beta$ (nm), the selective reflection wavelength is calculated from the following expression.

Selective Reflection Center Wavelength=$(\lambda\alpha+\lambda\beta)/2$

Half-Width=$(\lambda\beta-\lambda\alpha)$

Here, in the case of a sample having low diffusion reflection properties and strong specular reflection properties, a waveform of an integral reflection spectrum of the integral reflectivity may be scattered in a serrated shape. In this case, an average reflectivity (arithmetic mean) of a maximum value and a minimum value in a spectrum waveform of the above-described specular reflectivity is obtained. Among two wavelengths at two intersections between the waveform and the average reflectivity, in a case where a value of a wavelength on a short wavelength side is represented by $\lambda\alpha$ (nm) and a value of a wavelength on a long wavelength side is represented by $\lambda\beta$ (nm), the selective reflection wavelength may be calculated from the following expression.

In another method, by measuring a transmission spectrum of a sample using Axoscan manufactured by Axometrix Inc, the selective reflection center wavelength and the half-width can also be measured. By measuring the transmission spectrum, a transmission spectrum waveform having a valley shape (downward protrusion shape) in which the horizontal axis represents a wavelength is obtained. In this case, an average reflectivity (arithmetic mean) of a maximum value and a minimum value of the transmittance is obtained. Among two wavelengths at two intersections between the waveform and the average transmittance, in a case where a value of a wavelength on a short wavelength side is represented by $\lambda\alpha$ (nm) and a value of a wavelength on a long wavelength side is represented by $\lambda\beta$ (nm), the selective reflection center wavelength and the half-width are calculated from the above-described expressions.

One feature point of a transfer-type decorative sheet according to an embodiment of the present invention is that, for example, an underlayer is a layer that is formed of a composition including a monomer having one or two polymerizable groups, and a water contact angle of the underlayer is 50° or more.

By forming the underlayer using the composition including the predetermined monomer, peelability from a temporary support is improved. It is presumed that, in a case where the number of polymerizable groups is large, the underlayer forms a stronger polymerized film, anchoring with the temporary support is strengthened, and the underlayer has difficult in peeling from the temporary support.

In addition, by setting the water contact angle of the underlayer to be the predetermined value or more, the glossiness of a decorative layer in case of being seen from an oblique direction is improved.

FIG. 1 conceptually shows an example of the transfer-type decorative sheet according to the embodiment of the present invention.

A transfer-type decorative sheet 10 shown in FIG. 1 includes: a temporary support 12; an underlayer 14 that is peelable from and disposed on one surface of the temporary support 12; and a decorative layer 16 that is disposed on a surface of the underlayer 14. The decorative layer 16 includes: a first cholesteric liquid crystal layer 18; and a second cholesteric liquid crystal layer 20 that is formed on a surface of the first cholesteric liquid crystal layer 18.

FIG. 1 shows an aspect where the two cholesteric liquid crystal layers are laminated. However, only one cholesteric liquid crystal layer may be provided, or three or more cholesteric liquid crystal layers may be laminated.

In the following description, the upper side in the drawing, that is, the second cholesteric liquid crystal layer 20 side will also be referred to as "upper side", and the lower side in the drawing, that is, the temporary support 12 side will also be referred to as "lower side".

Hereinafter, the members forming the transfer-type decorative sheet will be described in detail.

<Temporary Support>

In the transfer-type decorative sheet, the temporary support is a member that supports the underlayer and the decorative layer described below and is peelable from and closely attached to the surface of the underlayer. As described below, in a case where the transfer-type decorative sheet is used, the transfer-type decorative sheet is peeled off from the temporary support after bonding the underlayer and the decorative layer to an object to be bonded.

In a case where an external force for peeling the temporary support is applied to the transfer-type decorative sheet, The transfer-type decorative sheet has properties in which peeling occurs between the temporary support and the underlayer without peeling between the underlayer and the decorative layer. That is, in the transfer-type decorative sheet, a peel strength between the underlayer and the decorative layer is higher than that between the temporary support and the underlayer.

The peel strength between the temporary support and the underlayer can be measured, for example, using the following method. First, the decorative layer side of the transfer-type decorative sheet is bonded to a stainless steel (SUS) sheet having a thickness of 2 mm through a commercially available pressure sensitive adhesive (for example, SK2057 manufactured by Soken Chemical & Engineering Co., Ltd.). Next, the temporary support of the transfer-type decorative sheet peels off in a 180° direction, and a load (peeling strength) at this time is measured using a force gauge. In the present invention, the temporary support being peelable from the underlayer represents that, when the measurement is performed at a peeling rate of 0.5 m/min, a peeling strength per sample width is 0.1 N/cm or lower.

As the temporary support, a resin film is preferable. That is, examples of a material forming the temporary support include a polyester resin such as polyethylene terephthalate (PET), a polycarbonate resin, a (meth)acrylic resin, an epoxy resin, a polyurethane resin, a cycloolefin resin, a polyamide resin, a polyolefin resin, a cellulose resin, and a silicone resin. In particular, as the temporary support, a PET film is preferable.

The (meth)acrylic resin is a generic name including an acrylic resin and a methacryloyl resin.

In order to adjust surface properties of the temporary support, a surface treatment can be appropriately performed. Examples of the surface treatment include a corona treatment, a normal temperature plasma treatment, a saponification treatment, a silicone treatment, a fluorine treatment, and an olefin treatment.

The temporary support may be a monolayer structure or a multilayer structure. In a case where the temporary support is a multilayer structure, the temporary support may have a configuration including: a substrate; and a peelable layer that is disposed on the substrate.

The thickness of the temporary support is not particularly limited and, from the viewpoint of handleability, is preferably 20 µm or more and more preferably 40 µm or more. The upper limit of the thickness is not particularly limited and is preferably 1000 µm or less, more preferably 500 µm or less, and still more preferably 300 µm or less.

<Underlayer>

In the transfer-type decorative sheet, the underlayer is peelable from and disposed on the temporary support.

The underlayer is a layer that is formed of a composition including a monomer having one or two polymerizable groups (hereinafter also referred to as "specific monomer"). That is, the underlayer is a layer that is formed of a composition including monomers, and the monomers include the specific monomer.

Hereinafter, first, components in the composition will be described in detail.

(Specific Monomer)

The specific monomer has one or two polymerizable groups. That is, the specific monomer may be a monomer selected from the group consisting of a monomer having one polymerizable group and a monomer having two polymerizable groups.

The kind of the polymerizable group is not particularly limited, and examples thereof include an unsaturated polymerizable group, an epoxy group, and an aziridinyl group. From the viewpoint of obtaining at least one of an effect that peelability of temporary support is further improved or an effect that the glossiness of the cholesteric liquid crystal layer is further improved, (hereinafter, also referred to as "from the viewpoint of further improving the effects of the present invention"), an unsaturated polymerizable group is preferable, an ethylenically unsaturated polymerizable group is more preferable, and a (meth)acryloyl group is still more preferable.

"(meth)acryloyl group" is a generic name including an acryloyl group and a methacryloyl group.

From the viewpoint of further improving the effects of the present invention, it is preferable that the specific monomer has a cyclic structure.

Examples of the cyclic structure include an alicyclic structure and an aromatic ring structure. From the viewpoint of further improving the effects of the present invention, an alicyclic structure is preferable.

The cyclic structure may be a monocyclic structure or a polycyclic structure. In the case of the polycyclic structure, the number of rings in the cyclic structure may be 2 or more and, from the viewpoint of further improving the effects of the present invention, is preferably 2 or 3.

That is, as the cyclic structure, a polycyclic aliphatic structure (polycyclic aliphatic hydrocarbon) is preferable.

As the cyclic structure, a structure represented by Formula (1) is preferable from the viewpoint of further improving the effects of the present invention.

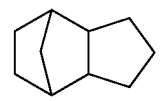

Formula (1)

As the specific monomer, a compound represented by Formula (2) is preferable from the viewpoint of further improving the effects of the present invention.

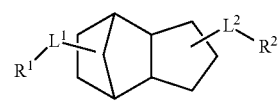

Formula (2)

$R^1$ and $R^2$ each independently represent a polymerizable group. The definition of the polymerizable group is as described above.

$L^1$ and $L^2$ each independently represent a single bond or a divalent linking group.

Examples of the divalent linking group include a divalent hydrocarbon group (for example, a divalent aliphatic hydrocarbon group such as an alkylene group having 1 to 10 carbon atoms, an alkenylene group having 1 to 10 carbon atoms, or an alkynylene group having 1 to 10 carbon atoms, or a divalent aromatic hydrocarbon group such as an arylene group), a divalent heterocyclic group, —O—, —S—, —NH—, —N(Q)-, —CO—, and a group including a combination thereof (for example, —O-divalent hydrocarbon group-, —(O-divalent hydrocarbon group)$_p$-O— (p represents an integer of 1 or more), or -divalent hydrocarbon group-O—CO—). Q represents a hydrogen atom or an alkyl group.

The specific monomer may be a compound represented by Formula (3) other than the compound represented by Formula (2).

Formula (3)

$R^3$'s each independently represent a polymerizable group. The definition of the polymerizable group is as described above.

$L^3$ represents a linear alkylene group. The number of carbon atoms in the alkylene group is not particularly limited and is preferably 1 to 20 and more preferably 5 to 15.

The specific monomer may be used alone or in combination of two or more kinds.

The content of the specific monomer in the composition is not particularly limited and may be 10 mass % or higher in many cases with respect to the total mass of the monomers in the composition and, from the viewpoint of further improving the effects of the present invention, is preferably 25 mass % or higher and more preferably 40 mass % or higher. The upper limit is not particularly limited and, for example, 100 mass %.

The total mass of the monomers in the composition refers to the total mass of all the monomers in the composition. For example, in a case where the composition includes the specific monomer and other monomers described below, the total mass of the monomers refers to the sum of the mass of the specific monomer and the mass of the other monomers.

(Other Components)

The composition may include components other than the specific monomer.

The composition may include a monomer having three or more polymerizable groups (hereinafter, also simply referred to as "other monomer").

The definition of the polymerizable group in the other monomer is as described above.

The number of the polymerizable groups in the other monomer is 3 or more and, from the viewpoint of further improving the effects of the present invention, is preferably 3 to 10, more preferably 3 to 6, and still more preferably 3 or 4.

Examples of the other monomer include a compound represented by Formula (4) and a compound represented by Formula (5).

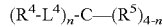   Formula (4)

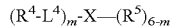   Formula (5)

$R^4$ represents a polymerizable group. The definition of the polymerizable group is as described above.

$L^4$ represents a single bond or a divalent linking group. Examples of the divalent linking group include divalent linking groups represented by $L^1$ and $L^2$.

$R^5$ represents a hydrogen atom or a substituent. As the substituent, a group other than a polymerizable group is preferable, and examples thereof include groups shown in the following substituent group W.

Substituent group W: a halogen atom, an alkyl group, an aryl group, a heteroaryl group, a cyano group, a hydroxyl group, a carboxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, and a combination thereof.

As the substituent represented by $R^5$, an alkyl group which may have a substituent, an aryl group which may have a substituent, or a heteroaryl group which may have a substituent is preferable. Examples of the substituent include groups shown in the substituent group W.

n represents an integer of 1 to 4.

X represents a hexavalent linking group. The hexavalent linking group is not particularly limited, and a group represented by Formula (6) is preferable.

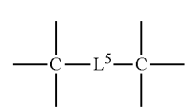   Formula (6)

In Formula (6), $L^5$ represents a divalent linking group. Examples of the divalent linking group include divalent linking groups represented by $L^1$ and $L^2$.

m represents an integer of 1 to 6.

As the polymerizable group in the other monomer, a (meth)acryloyl group is preferable.

Specific examples of the other monomer include ECH (ethylcyclohexane)-modified glycerol tri(meth)acrylate; EO (ethylene oxide)-modified glycerol tri(meth)acrylate, PO (propylene oxide)-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth) acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate (DPHA), dipentaerythritol hydroxy enta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy tetra(meth)acrylate, and pentaerythritol tetra(meth)acrylate.

The other monomers may be used alone or in combination of two or more kinds. For example, a mixture of the other monomers such as KAYARAD PET-30 (manufactured by Nippon Kayaku Co., Ltd.) may be used.

The content of the other monomers in the composition is not particularly limited and, from the viewpoint of further improving the effects of the present invention, is preferably 75 mass % or lower and more preferably 60 mass % or lower with respect to the total mass of the monomers in the composition. The lower limit is not particularly limited and, for example, 0 mass %.

The composition may include a polymerization initiator. The kind of the polymerization initiator is not particularly limited and examples thereof include a thermal polymerization initiator and a photopolymerization initiator. As the polymerization initiator, an acylphosphine oxide compound or an oxime compound is preferable.

As the polymerization initiator, one kind may be used alone, or two or more kinds may be used in combination.

The content of the polymerization initiator in the composition is preferably 0.1% to 20 mass % and more preferably 0.5% to 5 mass % with respect to the total mass of the monomers.

The composition may include a solvent. Examples of the solvent include water and an organic solvent.

Examples of the organic solvent include a ketone, an alkyl halide, an amide, a sulfoxide, a heterocyclic compound, a hydrocarbon, an ester, and an ether.

A method of forming the underlayer is not particularly limited, and examples thereof include a method of applying the above-described composition to the temporary support, optionally performing a drying treatment, and subsequently curing the obtained coating film.

Examples of a method of applying the composition include a well-known method.

Examples of a method of the drying treatment include a heating treatment. The temperature of the heating treatment is preferably 30° C. to 100° C., and the heating time is preferably 15 seconds to 600 seconds.

As the curing treatment, an optimum method is selected depending on the monomers to be used, and examples thereof include a light irradiation treatment and a heating treatment.

The thickness of the underlayer is not particularly limited and, from the viewpoint of further improving the effects of the present invention, is preferably 0.01 to 8.0 µm and more preferably 0.5 to 6.0 µm.

The water contact angle of the underlayer (the water contact angle of the surface of the underlayer) is 50° or more. From the viewpoint of further improving the effects of the present invention, the water contact angle of the underlayer is preferably 55° or more, more preferably 60° or more, and still more preferably 65° or more. The upper limit is not particularly limited and is preferably 110° C. or less, more preferably 100° C. or less, and still more preferably 80° C. or less.

As a method of measuring the water contact angle, a method of dripping water having a volume of 2 µl on the underlayer, waiting for 30 seconds, and obtaining the water contact angle using a θ/2 method can be used.

<Decorative Layer>

In the transfer-type decorative sheet, the decorative layer is disposed on the underlayer.

The decorative layer includes at least one cholesteric liquid crystal layer.

The cholesteric liquid crystal layer refers to a layer obtained by immobilizing a cholesteric liquid crystalline phase.

The cholesteric liquid crystal layer only needs to be a layer in which the alignment of the liquid crystal compound as a cholesteric liquid crystalline phase is immobilized. It is preferable that the cholesteric liquid crystal layer is a layer obtained by aligning a polymerizable liquid crystal compound to enter an alignment state of a cholesteric liquid crystalline phase and polymerizing and curing the polymerizable liquid crystal compound by ultraviolet irradiation, or heating, or the like. It is preferable that the cholesteric liquid crystal layer is a layer that has no fluidity and is changed into a state where the alignment state does not change due to an external field or an external force.

The cholesteric liquid crystal layer is not particularly limited as long as the optical characteristics of the cholesteric liquid crystalline phase are maintained, and the liquid crystal compound in the layer does not necessarily exhibit liquid crystallinity. For example, the molecular weight of the polymerizable liquid crystal compound may be increased by a curing reaction such that the liquid crystallinity thereof is lost.

It is known that the cholesteric liquid crystalline phase exhibits selective reflection properties at a specific wavelength.

A center wavelength of selective reflection (selective reflection center wavelength) λ of a general cholesteric liquid crystalline phase depends on a helical pitch P in the cholesteric liquid crystalline phase and complies with a relationship of λ=n×P with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the helical pitch increases.

The helical pitch refers to one pitch (period of helix) of the helical structure of the cholesteric liquid crystalline phase, in other words, one helical turn. That is, the helical pitch refers to the length in a helical axis direction in which a director (in the case of a rod-shaped liquid crystal, a major axis direction) of the liquid crystal compound constituting the cholesteric liquid crystalline phase rotates by 360°.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In addition, the cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A turning direction of the cholesteric liquid crystalline phase can be adjusted by adjusting the kind of the liquid crystal compound that forms the cholesteric liquid crystal layer and/or the kind of the chiral agent to be added.

It is preferable that the cholesteric liquid crystal layer has a pitch gradient structure in which a helical pitch changes in a thickness direction.

Hereinafter, the pitch gradient structure will be described in detail using the drawings.

Figure 2:
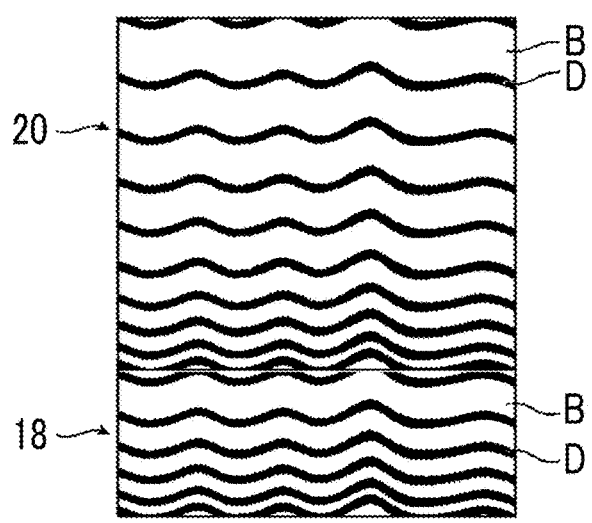
FIG. 2 is a cross-sectional view conceptually showing an example of a decorative layer.

First, FIG. 2 is a diagram conceptually showing a state where a cross-section of the decorative layer 16 in FIG. 1 is observed with a scanning electron microscope (SEM).

The first cholesteric liquid crystal layer 18 and the second cholesteric liquid crystal layer 20 are all cholesteric liquid crystal layers obtained by immobilizing a cholesteric liquid crystalline phase. Accordingly, in the first cholesteric liquid crystal layer 18 and the second cholesteric liquid crystal layer 20, a stripe pattern including bright portions B and dark portions D derived from the cholesteric liquid crystalline phase is observed.

In the example shown in the drawing, in the first cholesteric liquid crystal layer 18 and the second cholesteric liquid crystal layer 20, the helical pitch gradually increases upward. That is, in the first cholesteric liquid crystal layer 18 and the second cholesteric liquid crystal layer 20, a selective reflection center wavelength (that is, a wavelength range of light that is selectively reflected) gradually increases upward.

In the following description, in the cholesteric liquid crystal layer, the pitch gradient structure in which the helical pitch changes in the thickness direction will also be referred to as "a pitch gradient structure (PG structure)".

In order to form the cholesteric liquid crystal layer having the PG structure, the chiral agent in which back isomerization, dimerization, isomerization and dimerization, or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

For example, by using a chiral agent in which the HTP decreases during light irradiation, the HTP of the chiral agent decreases during light irradiation.

Here, light to be irradiated is absorbed by the chiral agent. Accordingly, for example, in a case where the light is irradiated from the upper side, the irradiation dose of the light gradually decreases from the upper side to the lower side. That is, the amount of decrease in the HTP of the chiral agent gradually decreases from above to below. Therefore, on the upper side where the decrease in HTP is large, the induction of helix is small, and thus the helical pitch is long. On the lower side where the decrease in HTP is small, helix is induced by the original HTP of the chiral agent, and thus the helical pitch decreases.

That is, in this case, in the cholesteric liquid crystal layer, longer wavelength light is selectively reflected from the upper side, and shorter wavelength light is selectively reflected from the lower side. Accordingly, by using the cholesteric liquid crystal layer having the PG structure in which the helical pitch changes in the thickness direction, light in a wide wavelength range can be selectively reflected.

In addition, in a cross-section of the cholesteric liquid crystal layer observed with a SEM, a stripe pattern in which bright portions B (bright lines) and dark portions D (dark lines) derived from a cholesteric liquid crystalline phase are alternately laminated in the thickness direction (the up-down direction in FIG. 2) is observed.

Here, as shown in FIG. 2, it is preferable that, in the cross-section of each of the first cholesteric liquid crystal layer 18 and the second cholesteric liquid crystal layer 20 observed with a SEM, the bright portions B and the dark portions D have the flapping structure in which at least a part thereof forms periodical flapping unevenness in a plane direction.

That is, it is preferable that the first cholesteric liquid crystal layer 18 and the second cholesteric liquid crystal layer 20 have a cholesteric liquid crystal structure in which an angle between the helical axis and the surface of the cholesteric liquid crystal layer periodically changes. In other words, it is preferable that both of the cholesteric liquid crystal layers have a cholesteric liquid crystal structure, the cholesteric liquid crystal structure provides the stripe pattern including the bright portions B and the dark portions D in a cross-sectional view of the decorative layer that is observed with a SEM, and an angle between a normal line of a line formed by a dark portion and the surface of the cholesteric liquid crystal layer periodically changes.

It is preferable that the flapping structure is a structure in which at least one region M where an absolute value of a tilt angle of a continuous line of the bright portions B or the dark portions D that form the stripe pattern with respect to a plane of the cholesteric liquid crystal layer is 5° or more is present, and a peak or valley having a tilt angle of 0° is specified at two points most adjacent to each other with the region M interposed therebetween in a plane direction.

The peak or valley having a tilt angle of 0° may have a protrusion shape or a recessed shape. However, the peak or valley may be a point having a stepwise shape or a rack shape as long as it has a tilt angle of 0°. In the flapping structure, it is preferable that the region M in which an absolute value of a tilt angle of a continuous line of the bright portions B or the dark portions D in the stripe pattern is 5° or more and the peak or valley in which the region M is interposed are repeated multiple times.

Figure 3:
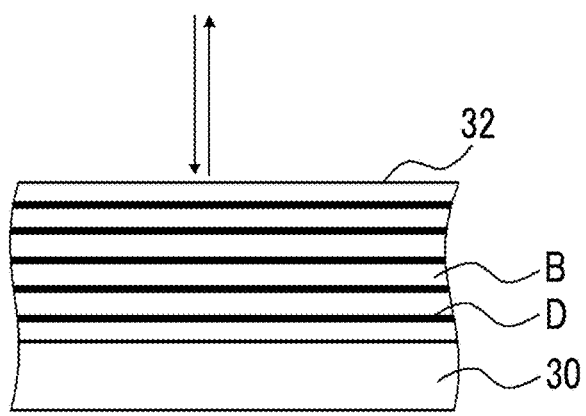
FIG. 3 is a conceptual diagram showing light reflection from a cholesteric liquid crystal layer.

FIG. 3 conceptually shows a cross-section of a layer obtained by immobilizing a general cholesteric liquid crystalline phase.

As shown in FIG. 3, in a case where a cross-section of a cholesteric liquid crystal layer 32 formed on a substrate 30 is observed with a SEM, the stripe pattern including the bright portions B and the dark portions D is observed. That is, in the cross-section of the cholesteric liquid crystal layer, a layered structure in which the bright portions B and the dark portions D are alternately laminated in the thickness direction is observed.

In the cholesteric liquid crystal layer, a structure in which the bright portion B and the dark portion D are repeated twice corresponds to the helical pitch. Therefore, the helical pitch of the cholesteric liquid crystal layer can be measured from a SEM cross-sectional view.

In the cholesteric liquid crystal layer 32, in general, the stripe pattern (layered structure) including the bright portions B and the dark portions D is formed parallel to the surface of the substrate 30 as shown in FIG. 3. In this aspect, the cholesteric liquid crystal layer 32 exhibits specular reflection properties. That is, in a case where light is incident from the normal direction of the cholesteric liquid crystal layer 32, the light is reflected from the normal direction. The light is not likely to be reflected in the oblique direction, and diffusion reflection properties are poor (refer to arrows in FIG. 3).

Figure 4:
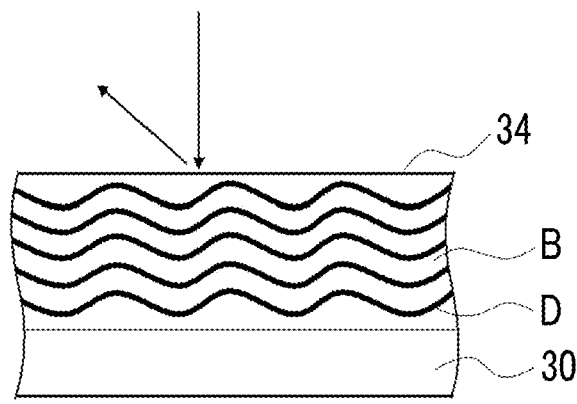
FIG. 4 is a conceptual diagram showing light reflection from the cholesteric liquid crystal layer.

On the other hand, in a case where the bright portions B and the dark portions D have the flapping structure (undulated structure) as in the cholesteric liquid crystal layer 34 of which the cross-section is conceptually shown in FIG. 4 and light is incident from the normal direction of the cholesteric liquid crystal layer 34, a region where the helical axis of the liquid crystal compound is tilted as conceptually shown in FIG. 4. Therefore, a part of the incidence light is reflected in the oblique direction (refer to arrows in FIG. 4).

That is, in the cholesteric liquid crystal layer obtained by immobilizing a cholesteric liquid crystalline phase, the bright portions B and the dark portions D have the flapping structure. As a result, the decorative layer having high diffusion reflection properties can be realized. As a result, in a case where the decorative layer is observed from various directions, excellent decorativeness can be obtained from any angle.

In the following description, the configuration in which the bright portions B and the dark portions D derived from a cholesteric liquid crystalline phase have the flapping structure in the cross-section of the cholesteric liquid crystal layer observed with a SEM will also be simply referred to as "the cholesteric liquid crystal layer has the flapping structure".

The cholesteric liquid crystal layer having the flapping structure can be formed by forming the cholesteric liquid crystal layer on the above-described underlayer surface. In particular, the cholesteric liquid crystal layer having the flapping structure can be more easily formed by forming the cholesteric liquid crystal layer without performing the alignment treatment such as rubbing on the underlayer.

That is, in a case where the cholesteric liquid crystal layer is formed on the underlayer on which the alignment treatment is not performed, there is no horizontal alignment restriction force with respect to the liquid crystal compound, and thus the alignment direction of the liquid crystal compound on the surface of the underlayer varies depending on physical properties of the underlayer. In a case where the cholesteric liquid crystal layer is formed in this state, the helical axis of the liquid crystal compound forming the cholesteric liquid crystalline phase faces various directions. As a result, in the cholesteric liquid crystal layer, the stripe pattern including the bright portions B and the dark portions D have the flapping structure.

In addition, typically, in a case where the cholesteric liquid crystal layer is formed on the cholesteric liquid crystal layer, the upper cholesteric liquid crystal layer follows the alignment state of the surface of the lower cholesteric liquid crystal layer. In other words, in a case where the cholesteric liquid crystal layer is formed on the cholesteric liquid crystal layer, the alignment state of the upper cholesteric liquid crystal layer follows the alignment state of the surface of the lower cholesteric liquid crystal layer.

Accordingly, as shown in FIG. 2, in a case where the second cholesteric liquid crystal layer 20 as the cholesteric liquid crystal layer is formed on the first cholesteric liquid crystal layer 18 having the flapping structure, the second cholesteric liquid crystal layer 20 follows the alignment state of the surface of the first cholesteric liquid crystal layer 18 such that the second cholesteric liquid crystal layer 20 also has the same flapping structure as the first cholesteric liquid crystal layer 18. Therefore, in the transfer-type decorative sheet 10, the first cholesteric liquid crystal layer 18 and the second cholesteric liquid crystal layer 20 have the same flapping structure in which the periods of undulation, that is, the unevenness shapes of the flapping structure substantially match each other.

In a case where the decorative layer includes a plurality of cholesteric liquid crystal layers, the amplitudes of undulation (the heights of undulation (unevenness)) in the respective cholesteric liquid crystal layers may be the same or different from each other.

Here, in a case where a general chiral agent is exposed to light, the HTP thereof decreases. In addition, light for changing the HTP of the chiral agent is typically emitted from the side opposite to the temporary support.

In addition, in the first cholesteric liquid crystal layer and the second cholesteric liquid crystal layer, the amplitudes of undulation may be the same as or different from each other, and a region having the same amplitude of undulation and a region having different amplitudes of undulation may be mixed.

The bright portions B and the dark portions D of the cholesteric liquid crystal layer are not limited to a configuration in which the entire area of all the bright portions B and the dark portions D have the flapping structure, and at least a part of the bright portions B and the dark portions D only needs to have the flapping structure.

That is, the bright portions B and the dark portions D in the cholesteric liquid crystal layer may include a region not having the flapping structure due to the formation of a defect portion or the like.

It is preferable that the decorative layer includes a plurality of cholesteric liquid crystal layers having the flapping structure and at least one of the cholesteric liquid crystal layers has the PG structure in which the helical pitch changes in the thickness direction.

In a case where the decorative layer has the above-described configuration, the transfer-type decorative sheet that can reflect light in a wide wavelength range with excellent diffusibility and has excellent properties such as inconspicuous color unevenness, light amount unevenness, and the like caused by defects of the cholesteric liquid crystal layer can be realized.

As described above, in the transfer-type decorative sheet in which the cholesteric liquid crystal layer is used as the decorative layer, in order to obtain excellent glossiness, it is preferable that, in the cross-section of the cholesteric liquid crystal layer observed with a SEM, the bright portions B and the dark portions D derived from a cholesteric liquid crystalline phase have the flapping structure. In addition, in order to widen the selective reflection wavelength range, it is preferable that the PG structure in which the helical pitch changes in the thickness direction of the cholesteric liquid crystal layer is provided.

Here, as described above, the PG structure can be obtained by using a chiral agent of which the HTP changes by light irradiation and irradiating the chiral agent with light having a wavelength that is absorbed by the chiral agent during the formation of the cholesteric liquid crystal layer such that the irradiation dose of light in the thickness direction, that is, the amount of change in HTP changes. Accordingly, as a difference in the irradiation dose of the light during the formation of the cholesteric liquid crystal layer increases in the thickness direction, the selective reflection wavelength range can be widened.

The thickness of the cholesteric liquid crystal layer is not particularly limited and is preferably 0.05 to 10 µm, more preferably 0.2 to 9.0 µm, and still more preferably 0.5 to 8.0 µm.

The thickness of the decorative layer is not particularly limited and, from the viewpoint of further improving the effects of the present invention, is preferably 5.0 µm or more. The upper limit is not particularly limited and is 20 µm or less in many cases.

In the cholesteric liquid crystal layer, the peak-to-peak distance and the amplitude (the height of undulation) of the flapping structure are also not particularly limited.

Here, in the cholesteric liquid crystal layer having the flapping structure, as the peak-to-peak distance decreases, higher diffusion reflection properties are exhibited. In addition, as the amplitude increases, higher diffusion reflection properties are exhibited.

From the viewpoints of forming the flapping structure having a small amount of defects and obtaining higher diffusion reflection properties, the average value of peak-to-peak distances in the flapping structure of the cholesteric liquid crystal layer is preferably 0.5 to 50 µm, more preferably 1.5 to 20 µm, and still more preferably 2.5 to 10 µm.

Figure 5:
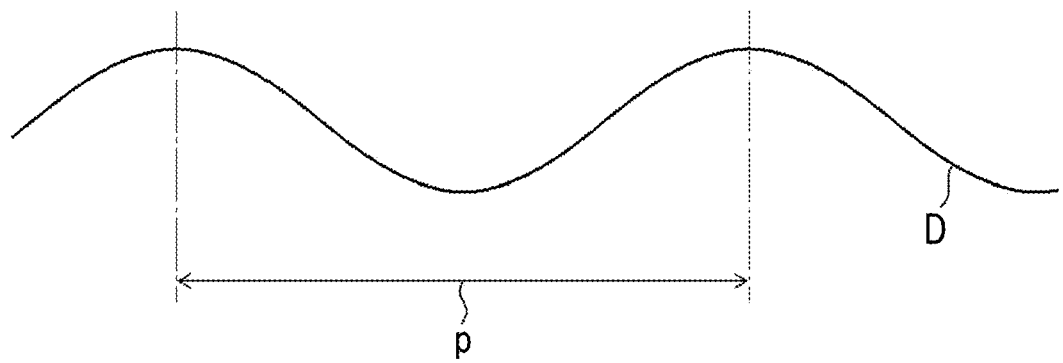
FIG. 5 is a conceptual diagram showing a peak-to-peak distance of a flapping structure.

The peak-to-peak distance of the flapping structure refers to a distance p between peaks of convex portions most adjacent to each other in the flapping structure as conceptually shown in FIG. 5.

Specifically, the average value of the peak-to-peak distances is obtained as follows. The distance in the plane direction of the cholesteric liquid crystal layer between peaks (or valleys) having a tilt angle of 0° at two points that are most adjacent to each other with respect to a region M where the absolute value of a tilt angle with respect to a plane of the cholesteric liquid crystal layer is 5° or more is measured. By performing the above-described measurement at 100 positions and averaging the obtained values, the average value of the peak-to-peak distances is obtained.

In a case where the transfer-type decorative sheet according to the embodiment of the present invention includes a plurality of cholesteric liquid crystal layers, the wavelength ranges where the cholesteric liquid crystal layers selectively reflect light may be the same as or different from each other.

In addition, in a case where the transfer-type decorative sheet according to the embodiment of the present invention includes a plurality of cholesteric liquid crystal layers, turning directions of circularly polarized light to be reflected from the respective cholesteric liquid crystal layers may be the same as or different from each other.

As described above, the transfer-type decorative sheet according to the embodiment of the present invention may include three or more cholesteric liquid crystal layers.

In addition, in the PG structure of the cholesteric liquid crystal layer, the helical pitch may gradually increase upward, or the helical pitch may gradually increase downward.

Regarding the transfer-type decorative sheet according to the embodiment of the present invention, in order to form the cholesteric liquid crystal layer, light irradiation for curing the cholesteric liquid crystal layer may be performed after performing light irradiation for changing the HTP of the chiral agent. Alternatively, light irradiation for changing the HTP of the chiral agent and light irradiation for curing the cholesteric liquid crystal layer may be performed at the same time.

Regarding the decorative layer in the transfer-type decorative sheet according to the embodiment of the present invention, the integral reflectivity I-R($\lambda$) at the wavelength $\lambda$ and the specular reflectivity S-R($\lambda$) at the wavelength $\lambda$ are not particularly limited.

In particular, from the viewpoint of further improving the effects of the present invention, a maximum reflectivity of an integral reflection spectrum in a wavelength range of 380 to 780 nm of the decorative layer is preferably 50% or higher and more preferably 60% or higher. The upper limit is not particularly limited and is 98% or lower in many cases.

In addition, from the viewpoint of further improving the effects of the present invention, a specular reflectivity at a wavelength at which the decorative layer has the maximum reflectivity is preferably 20% or lower and more preferably 15% or lower. The lower limit is not particularly limited and is 10% or higher in many cases.

In addition, in the decorative layer of the transfer-type decorative sheet according to the embodiment of the present invention, a half-width of a reflection spectrum in a wavelength range where light is selectively reflected is not particularly limited.

From the viewpoint that, for example, light in a wider wavelength range can be reflected, the half-width of the integral reflection spectrum is preferably 80 to 250 nm.

A method of forming the cholesteric liquid crystal layer is not particularly limited. For example, the cholesteric liquid crystal layer can be formed of a liquid crystal composition including a liquid crystal compound and a chiral agent.

Hereinafter, the above-described formation method will be described in detail. First, the components in the composition to be used will be described in detail.

(Liquid Crystal Compound)

It is preferable that the liquid crystal compound used for forming the cholesteric liquid crystal layer has two or more polymerizable groups. That is, a polymerizable liquid crystal compound is preferable. In addition, an average molar absorption coefficient in 300 to 400 nm is preferably lower than 5000.

The liquid crystal compound may be a rod-shaped liquid crystal compound or a disk-shaped liquid crystal compound and is preferably a rod-shaped liquid crystal compound.

Examples of the rod-shaped liquid crystal compound for forming a cholesteric liquid crystal structure include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferable.

As the liquid crystal compound, not only a low-molecular-weight liquid crystal compound but also a high-molecular-weight liquid crystal compound can be used.

The kind of the polymerizable group is not particularly limited, and examples thereof include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods.

The number of polymerizable groups in the liquid crystal compound is preferably 1 to 6 and more preferably 1 to 3 in one molecule.

Examples of the liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO1995/22586A, WO1995/024455A, WO1997/00600A, WO1998/023580A, WO1998/052905A, WO2016/194327A, WO2016/052367A, JP1989-272551A (JP-H1-272551A), JP1994-016616A (JP-H6-016616A), JP1995-110469A (JP-H7-110469A), JP1999-80081A (JP-H11-80081A), and JP2001-328973A.

The liquid crystal composition may include two or more liquid crystal compounds.

In addition, the content of the liquid crystal compound in the liquid crystal composition is not particularly limited and is preferably 80% to 99.9 mass %, more preferably 84% to 99.5 mass %, and still more preferably 87% to 99 mass % with respect to the solid content mass (mass excluding a solvent) of the liquid crystal composition.

(Chiral Agent: Optically Active Compound)

As the chiral agent used for forming the cholesteric liquid crystal layer, any well-known chiral agents can be used as long as the HTP thereof changes by light irradiation. A chiral agent having a molar absorption coefficient of 30000 or higher at a wavelength of 313 nm is preferable.

The chiral agent has a function of causing a helical structure of a cholesteric liquid crystalline phase to be formed. The chiral compound may be selected depending on the purpose because a helical sense or a helical pitch induced from the compound varies.

As the chiral agent, a well-known compound can be used, but a compound having a cinnamoyl group is preferable. Examples of the chiral agent include compounds described in Liquid Crystal Device Handbook (No. 142 Committee of Japan Society for the Promotion of Science, 1989, Chapter 3, Article 4-3, chiral agent for TN or STN, p. 199), JP2003-287623A, JP2002-302487A, JP2002-080478A, JP2002-080851A, JP2010-181852A, and JP2014-034581A.

In general, the chiral agent includes an asymmetric carbon atom. However, an axially asymmetric compound or a planar asymmetric compound not having an asymmetric carbon atom can be used as the chiral agent. Examples of the axially asymmetric compound or the planar asymmetric compound include binaphthyl, helicene, paracyclophane, and derivatives thereof. The chiral agent may include a polymerizable group.

In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative is preferable. As the isosorbide derivative, a commercially available product such as LC-756 (manufactured by BASF SE) may be used.

The content of the chiral agent in the liquid crystal composition is preferably 0.01% to 200 mol % and more preferably 1% to 30 mol % with respect to the total molar amount of the liquid crystal compound.

(Polymerization Initiator)

It is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

As the polymerization initiator that can be used, an acylphosphine oxide compound or an oxime compound is preferable.

As the polymerization initiator, one kind may be used alone, or two or more kinds may be used in combination.

In a case where light irradiation for curing the cholesteric liquid crystal layer is performed to form the cholesteric liquid crystal layer after performing light irradiation for changing the HTP of the chiral agent, it is preferable to use a photopolymerization initiator that inhibits polymerization during the light irradiation for changing the HTP of the chiral agent. In this case, the content of the photopolymerization initiator in the liquid crystal composition is preferably 0.05% to 3 mass % and more preferably 0.3% to 1.5 mass % with respect to the total mass of the liquid crystal compound.

In addition, the light irradiation for changing the HTP of the chiral agent and the light irradiation for curing the cholesteric liquid crystal layer are performed at the same time, the content of the photopolymerization initiator in the liquid crystal composition is preferably 0.01% to 0.3 mass % and more preferably 0.01% to 0.2 mass % with respect to the total mass of the liquid crystal compound.

(Crosslinking Agent)

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited, and examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane.

The content of the crosslinking agent in the liquid crystal composition is preferably 3% to 20 mass % and more preferably 5% to 15 mass % with respect to the solid content of the liquid crystal composition.

(Alignment Control Agent)

The liquid crystal composition may include an alignment control agent contributing to the stable or rapid formation of a cholesteric liquid crystal structure with planar alignment.

Examples of the alignment control agent include fluorine (meth)acrylate polymers described in paragraphs "0018" to "0043" of JP2007-272185A, and compounds represented by Formulae (I) to (IV) described in paragraphs "0031" to "0034" of JP2012-203237A.

As the alignment control agent, one kind may be used alone, or two or more kinds may be used in combination.

The content of the alignment control agent in the liquid crystal composition is preferably 0.01 to 10 mass % and more preferably 0.01 to 5 mass % with respect to the total mass of the liquid crystal compound.

(Surfactant)

The liquid crystal composition may include a surfactant.

It is preferable that the surfactant is a compound which can function as an alignment control agent contributing to the stable or rapid formation of a cholesteric structure with planar alignment. Examples of the surfactant include a silicone surfactant and a fluorine surfactant. Among these, a fluorine surfactant is preferable.

The content of the surfactant in the liquid crystal composition is preferably 0.01 to 10 mass % and more preferably 0.01 to 5 mass % with respect to the total mass of the liquid crystal compound.

(Solvent)

The liquid crystal composition may include a solvent.

As the solvent, an organic solvent is preferable. The organic solvent is not particularly limited, and examples thereof include a ketone, an alkyl halide, an amide, a sulfoxide, a heterocyclic compound, a hydrocarbon, an ester, and an ether.

As the solvent, one kind may be used alone, or two or more kinds may be used in combination.

(Other Additives)

Optionally, the liquid crystal composition may further include a polymerization inhibitor, an antioxidant, an ultraviolet absorber, a light stabilizer, a coloring material, metal oxide particles, or the like in a range where optical performance does not deteriorate.

The cholesteric liquid crystal layer can be formed by dissolving the liquid crystal compound, the chiral agent, and the polymerization initiator and further the optionally added surfactant or the like in a solvent to prepare a liquid crystal composition, applying the liquid crystal composition to the underlayer, drying the liquid crystal composition to obtain a coating film, aligning the liquid crystal compound in the coating film, and irradiating the coating film with an actinic ray to cure the liquid crystal composition. As a result, the cholesteric liquid crystal layer having a cholesteric liquid crystal structure in which cholesteric regularity is immobilized can be formed.

Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method.

Examples of a method of aligning the liquid crystal compound in the coating film formed by applying the liquid crystal composition include a heating treatment. The temperature of the heating treatment is preferably 200° C. or lower and more preferably 130° C. or lower. Through the alignment treatment, a structure in which the liquid crystal compound is twisted and aligned to have a helical axis can be obtained.

Next, by polymerizing the aligned liquid crystal compound, the liquid crystal composition can be cured to form the cholesteric liquid crystal layer.

It is preferable that light irradiation for curing the liquid crystal composition is performed by ultraviolet irradiation. The illuminance of ultraviolet light is preferably 15 to 1500 mW/cm$^2$ and more preferably 100 to 600 mW/cm$^2$. In addition, the irradiation energy of ultraviolet light is preferably 20 mJ/cm$^2$ to 50 J/cm$^2$ and more preferably 100 to 1500 mJ/cm$^2$.

In a case where the cholesteric liquid crystal layer having the PG structure is formed, light irradiation for changing the HTP of the chiral agent is performed before the curing of the liquid crystal composition. Alternatively, in a case where the cholesteric liquid crystal layer having the PG structure is formed, light irradiation for changing the HTP of the chiral agent and light irradiation for curing the liquid crystal composition may be performed at the same time.

During the formation of the cholesteric liquid crystal layer, in order to promote the change of the HTP of the chiral agent, it is preferable that ultraviolet irradiation is performed after heating. During the ultraviolet irradiation for promoting the change of the HTP of the chiral agent, the oxygen concentration is not particularly limited. Accordingly, the ultraviolet irradiation may be performed in an oxygen atmosphere or in a low oxygen atmosphere.

The temperature during the ultraviolet irradiation is preferably 25° C. to 140° C. and more preferably 30° C. to 100° C.

In addition, the oxygen concentration during the ultraviolet irradiation is preferably 5000 vol ppm or lower and more preferably 100 vol ppm or lower.

<Method of Manufacturing Transfer-Type Decorative Sheet>

The method of manufacturing the transfer-type decorative sheet according to the embodiment of the present invention is not particularly limited, and a well-known method can be adopted.

In particular, from the viewpoint of excellent productivity, a method including: a step of forming the underlayer on the temporary support; and a step of forming the decorative layer on the underlayer, can be adopted.

Examples of a procedure of the step of forming the underlayer on the temporary support include the above-described method of manufacturing the underlayer. Specific examples of the method include a method of applying the above-described composition including the specific monomer to the temporary support, optionally performing a drying treatment, and subsequently curing the obtained coating film.

Examples of a procedure of the step of forming the decorative layer on the underlayer include the above-described method of manufacturing the decorative layer (cholesteric liquid crystal layer). Specific examples of the method include a method including: applying the liquid crystal composition including the liquid crystal compound and the chiral agent to the underlayer; drying the liquid crystal composition to obtain a coating film; aligning the liquid crystal compound in the coating film; and irradiating the coating film with an actinic ray to cure the liquid crystal composition.

<Applications of Transfer-Type Decorative Sheet>

The transfer-type decorative sheet is used for transferring the decorative layer. A method of transferring the decorative layer is not particularly limited, and examples thereof include a method including: bonding the decorative layer of the transfer-type decorative sheet and an object to be bonded to each other through an pressure-sensitive adhesive layer or an adhesive layer; and peeling the temporary support from the obtained bonded material.

The transfer-type decorative sheet according to the embodiment of the present invention can be used for various applications to which the decorative layer formed of the cholesteric liquid crystal layer is applied. The transfer-type decorative sheet according to the embodiment of the present invention can be used for various applications such as a light reflection member, a light diffusion plate, a half mirror, a transparent screen, an imaging element, a sensor, an optical device, or other optical elements. For example, in an aspect where the decorative layer in the transfer-type decorative sheet according to the embodiment of the present invention is used for an optical device including: the decorative layer and an element using light transmitted through the decorative layer, by using the decorative layer, light reflected from a surface or the like of the element using light transmitted through the decorative layer can be prevented from reaching the outside of the optical device, and thus the element using light transmitted through the decorative layer can be made to be inconspicuous.

The element using light transmitted through the decorative layer is not particularly limited, and various elements such as an imaging element or a sensor can be used. In this case, the decorative layer may be used as a decorative sheet, for example, after being bonded to an optical filter such as a SC filter (manufactured by Fujifilm Corporation) or an IR filter (manufactured by Fujifilm Corporation). As a result, decoration corresponding to a light receiving wavelength of an element such as an imaging element or a sensor can be made.

In addition, an image display device including the decorative layer transferred from the transfer-type decorative sheet according to the embodiment of the present invention and an image display element may be provided.

As the image display element, various well-known image display elements can be used. For example, a liquid crystal display element or an organic electroluminescence display element can be used.

Further, the transfer-type decorative sheet according to the embodiment of the present invention can also be used for an optical element. For example, the decorative layer according to the embodiment of the present invention can also be used for a general half mirror or for an application described in paragraph "0017" of JP2017-092021A.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

Example 1

(Formation of Underlayer)

As the temporary support, a PET film (COSMOSHINE A4100, manufactured by Toyobo Co., Ltd.) having a thickness of 50 µm and with one easily adhesive surface and one highly smooth surface was prepared.

An underlayer-forming coating solution having the following composition was applied to the highly smooth surface of the temporary support using a #4.4 wire bar coater. Next, the obtained coating film was applied, was dried at 45° C. for 60 seconds, and was irradiated with ultraviolet light at 500 mJ/cm² at 25° C. using an ultraviolet irradiation device. As a result, the temporary support with the underlayer having a thickness of 1.5 m was prepared.

| [Underlayer-Forming Coating Solution] | |
|---|---|
| DCP (NK ESTER DCP, manufactured by Shin-Nakamura Chemical Co., Ltd.) | 100 parts by mass |
| Photopolymerization Initiator A | 3.0 parts by mass |
| Photopolymerization Initiator B | 1.0 part by mass |
| The following surfactant F1 | 0.01 parts by mass |
| Methyl ethyl ketone | 156 parts by mass |
| Cyclohexanone | 156 parts by mass |

Photopolymerization Initiator A: IRGACURE-907 (manufactured by BASF SE)

Photopolymerization Initiator B: KAYACURE DETX-S (manufactured by Nippon Kayaku Co., Ltd.)

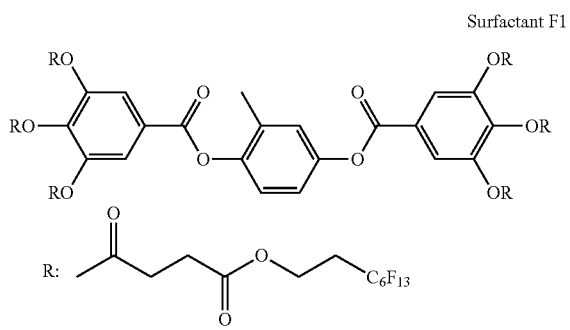

Surfactant F1

(Chiral Agent)

The following two chiral agents A and B were prepared. Using this chiral agent, the first cholesteric liquid crystal layer and the second cholesteric liquid crystal layer described below were formed.

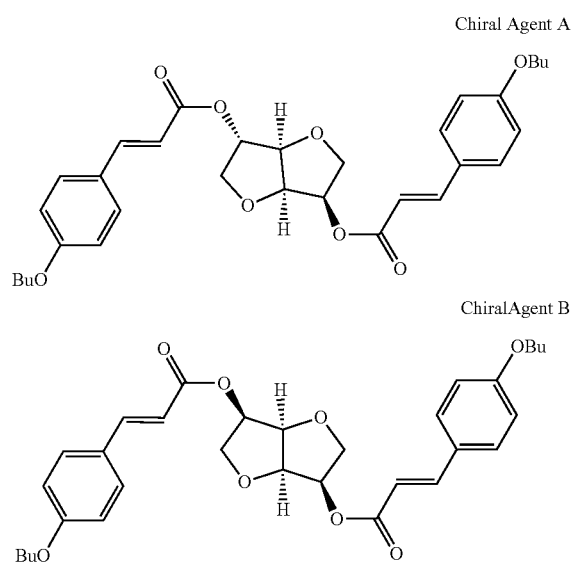

The chiral agent A is a chiral agent that forms a right-handed helix. In addition, the chiral agent B is a chiral agent that forms a left-handed helix. The chiral agents A and B are chiral agents having a cinnamoyl group.

Regarding each of the chiral agents A and B, a maximum molar absorption coefficient, a maximum wavelength at which the molar absorption coefficient is maximum is obtained, and a molar absorption coefficient at a wavelength of 313 nm are shown in Table 1 below.

TABLE 1

| | εMAX | Maximum Wavelength | ε@313 | Cinnamoyl Group |
|---|---|---|---|---|
| Chiral Agent A | 56000 | 314 nm | 55000 | Present |
| Chiral Agent B | 54000 | 312 nm | 53000 | Present |

In Table 1, εMAX represents the maximum molar absorption coefficient, and ε@313 represents a molar absorption coefficient at 313 nm.

(Formation of First Cholesteric Liquid Crystal Layer)

A composition shown below was stirred in a container held at 25° C. to prepare a coating solution Ch-B.

| [Coating Solution Ch-B] | |
|---|---|
| Methyl ethyl ketone | 152.2 parts by mass |
| Mixture of the following rod-shaped liquid crystal compounds | 100.0 parts by mass |
| Photopolymerization Initiator B | 0.50 part by mass |
| Chiral agent B | 11.90 parts by mass |
| The above-described surfactant F1 | 0.027 parts by mass |
| The following surfactant F2 | 0.067 parts by mass |

Mixture of Rod-Shaped Liquid Crystal Compounds

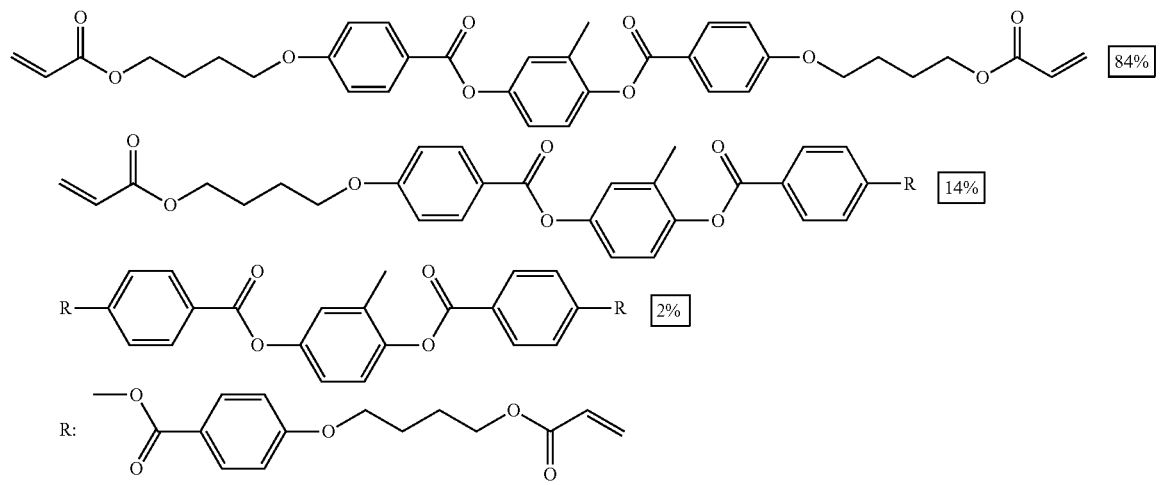

In the above-described mixture, a numerical value is represented by mass %. In addition, R represents a group to be bonded to an oxygen atom. In addition, an average molar absorption coefficient of the rod-shaped liquid crystal compound at a wavelength of 300 to 400 nm was 140/mol·cm.

Surfactant F2

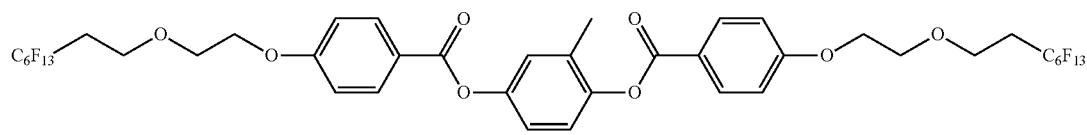

The prepared coating solution Ch-B was applied using a #6 wire bar coater to the surface of the underlayer prepared as described above, and was dried at 105° C. for 60 seconds to obtain a coating film.

Next by irradiating the coating film with light from a metal halide lamp in a low oxygen atmosphere (100 vol ppm or lower) at 75° C. and an irradiation dose of 60 mJ/cm² through an optical filter SH0350 (manufactured by Asahi Spectra Co., Ltd.) and further irradiating the coating film with light from a metal halide lamp at 100° C. and an irradiation dose of 500 mJ/cm², a first cholesteric liquid crystal layer was prepared.

(Formation of Second Cholesteric Liquid Crystal Layer)

A composition shown below was stirred in a container held at 25° C. to prepare a coating solution Ch-A.

| [Coating Solution Ch-A] | |
|---|---|
| Methyl ethyl ketone | 145.0 parts by mass |
| Mixture of the rod-shaped liquid crystal compounds | 100.0 parts by mass |
| Photopolymerization Initiator A | 0.02 parts by mass |
| Photopolymerization Initiator B | 1.00 part by mass |
| Chiral agent A | 6.10 parts by mass |
| The above-described surfactant F1 | 0.027 parts by mass |
| The above-described surfactant F2 | 0.067 parts by mass |

The prepared coating solution Ch-A was applied using a #12 wire bar coater to the surface of the first cholesteric liquid crystal layer prepared as described above, and was dried at 105° C. for 60 seconds to obtain a coating film.

Next by irradiating the coating film with light from a metal halide lamp in a low oxygen atmosphere (100 vol ppm or lower) at 40° C. and an irradiation dose of 60 mJ/cm² through an optical filter SH0350 (manufactured by Asahi Spectra Co., Ltd.) and further irradiating the coating film with light from a metal halide lamp at 100° C. and an irradiation dose of 500 mJ/cm², a second cholesteric liquid crystal layer was prepared. As a result, a transfer-type decorative sheet was prepared.

Examples 2 to 6 and Comparative Examples 1 to 4

Transfer-type decorative sheets were prepared according to the same procedure as that of Example 1, except that monomers shown in Table 2 were used instead of DCP in the underlayer-forming coating solution.

<Verification of Thickness, Flapping Structure, and PG Structure of Cholesteric Liquid Crystal Layer>

Cross-sections of the prepared cholesteric liquid crystal layers (the first cholesteric liquid crystal layer and the second cholesteric liquid crystal layer) were observed with a SEM, and it was found from the SEM image that the thickness of the first cholesteric liquid crystal layer was 2.6 μm and the thickness of the second cholesteric liquid crystal layer was 6.1 μm.

In addition, it was found from the SEM image that all the cholesteric liquid crystal layers have the flapping structure and the PG structure.

<Evaluation>

The prepared transfer-type decorative sheet was evaluated as follows.

[Measurement of Integral Reflectivity]

Using a device in which a large integrating sphere device (ILV-471, manufactured by JASCO Corporation) was attached to a spectrophotometer (V-550, manufactured by JASCO Corporation), an integral reflection spectrum of the decorative layer of the transfer-type decorative sheet was measured to include specularly reflected light without using optical trap such that light was incident from the second cholesteric liquid crystal layer. In the obtained integral reflection spectrum, a maximum reflectivity [%] in a wavelength range of 380 to 780 nm was obtained as a maximum reflectivity.

(Measurement of Specular Reflectivity)

Using a device in which an absolute reflectivity measurement device (ARV-474, manufactured by JASCO Corporation) was attached to a spectrophotometer (V-550, manufactured by JASCO Corporation), a specular reflection spectrum of the decorative layer of the transfer-type decorative sheet at an incidence angle of 5° was measured such that light was incident from the second cholesteric liquid crystal layer. In the obtained specular reflection spectrum, a specular reflectivity [%] at a wavelength at which the maximum reflectivity was exhibited was obtained.

(Half-Width)

A half-width [nm] of the integral reflection spectrum was measured as described above from the measured integral reflection spectrum.

(Average Value of Peak-to-Peak Distances of Flapping Structure)

An average value [µm] of peak-to-peak distances of the flapping structure was measured as described above from the cross-sectional SEM image of the transfer-type decorative sheet. The obtained average value was 7.2 µm.

The peak-to-peak distance is the average value of the two layers including the first cholesteric liquid crystal layer and the second cholesteric liquid crystal layer.

(Evaluation of Peelability)

The second cholesteric liquid crystal layer of the prepared transfer-type decorative sheet was bonded to a polycarbonate sheet (thickness: 200 µm) through a commercially available pressure sensitive adhesive (for example, SK2057, manufactured by Soken Chemical & Engineering Co., Ltd.).

Next, in a case where the PET film as the temporary support was peeled off from the bonded material, the feeling was evaluated based on the following standards. The results are shown in Table 2.
- A: the temporary support was gently peeled off
- B: the temporary support was slightly stuck
- C: the peeling strength was high to some extent, and the resistance was felt
- D: the peeling strength was very high, and the support was broken (Evaluation of Glossiness)

The prepared transfer-type decorative sheet was placed on black paper, and in a case where the cholesteric liquid crystal layer in the transfer-type decorative sheet was observed by visual inspection from a direction with a polar angle of 30°. The glossiness was evaluated based on the following standards. The transfer-type decorative sheet was placed on the black paper such that the temporary support in the transfer-type decorative sheet was positioned on the black paper side. The results are shown in Table 2.
- A: no problem
- B: the glossiness was poor Reference signs of the respective monomers in Table 2 are as follows.

DPHA: KAYARAD DPHA, manufactured by Nippon Kayaku Co., Ltd. (the following compound)

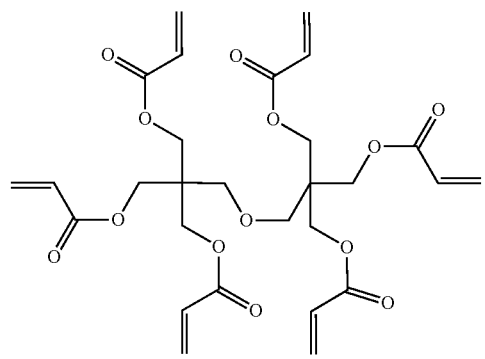 [SMILES: C=CC(=O)OCC(COCC(COC(=O)C=C)(COC(=O)C=C)COC(=O)C=C)(COC(=O)C=C)COC(=O)C=C]

PET 30: KAYARAD PET-30, manufactured by Nippon Kayaku Co., Ltd. (mixture of the following two compounds)

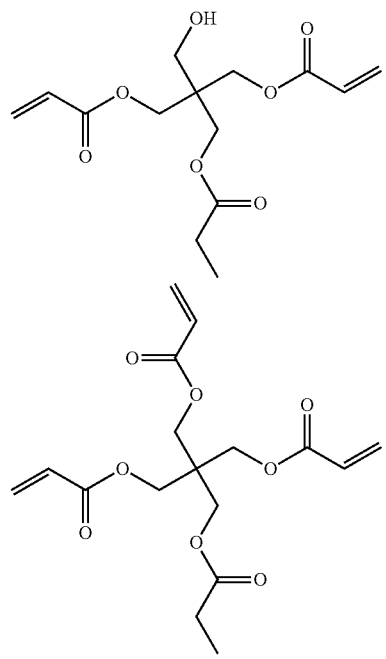

DCP: NK ESTER DCP, manufactured by Shin-Nakamura Chemical Co., Ltd. (the following compound)

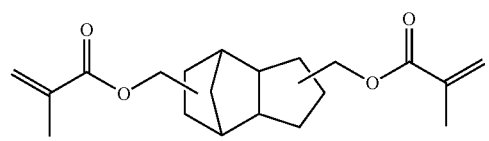

A-DCP: NK ESTER A-DCP, manufactured by Shin-Nakamura Chemical Co., Ltd. (the following compound)

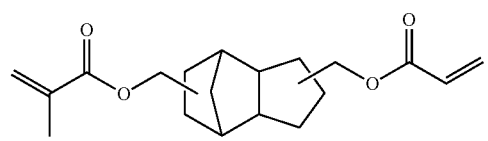

A-NOD-N: NK ESTER A-NOD-N, manufactured by Shin-Nakamura Chemical Co., Ltd. (the following compound)

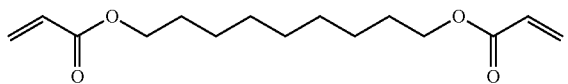 [SMILES: C=CC(=O)OCCCCCCCCCOC(=O)C=C]

GLM: BLEMMER GLM, manufactured by NOF Corporation (the following compound)

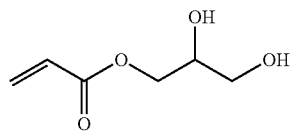

In Table 2, the column "water contact angle" represents the water contact angle of the underlayer surface.

In Table 2, the numerical value of the monomer column represent mass % of each of the monomers with respect all the monomers in the composition. For example, in Example 2, 50 mass % of PET-30 and 50 mass % of DCP were used.

TABLE 2

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Number of Polymerizable Groups in Monomer ( ) | DPHA (6) | | | | | | | | 100 | | |
| | PET-30 (3 to 4) | | 50 | 70 | 80 | | | 100 | | | 50 |
| | DCP (2) | 100 | 50 | 30 | 20 | | | | | | |
| | A-DCP (2) | | | | | 100 | | | | | |
| | A-NOD-N (2) | | | | | | 100 | | | | |
| | GLM (1) | | | | | | | | | 100 | 50 |
| Evaluation | Water Contact Angle (°) | 72 | 70 | 71 | 71 | 68 | 74 | 58 | 59 | 19 | 47 |
| | Peelability | A | A | B | C | A | B | D | D | B | C |
| | Glossiness | A | A | A | A | A | A | A | A | B | B |
| | Maximum Reflectivity (%) | 78 | 80 | 78 | 83 | 82 | 80 | 79 | 78 | 78 | 78 |
| | Specular Reflectivity (%) | 12 | 12 | 12 | 12 | 12 | 12 | 12 | 12 | 12 | 12 |
| | Half-Width of Reflectivity Peak (nm) | 95 | 100 | 99 | 102 | 91 | 110 | 98 | 100 | 107 | 110 |

As shown in Table 2, it was found that the transfer-type decorative sheet according to the embodiment of the present invention exhibited the desired effects.

In particular, it was found from comparison between Examples 1 to 4 that, in a case where the content of the monomer having one or two polymerizable groups is 25 mass % or higher (preferably 40 mass % or higher) with respect to the total mass of the monomers, the effects are higher.

In addition, it was found from comparison between Examples 1, 5, and 6 that, in a case where the monomer having one or two polymerizable groups has a cyclic structure, the effects are higher.

EXPLANATION OF REFERENCES

10: transfer-type decorative sheet
12: temporary support
14: underlayer
16: decorative layer
18: first cholesteric liquid crystal layer
20: second cholesteric liquid crystal layer
30: substrate
32, 34: cholesteric liquid crystal layer
B: bright portion
D: dark portion
p: distance

What is claimed is:

1. A transfer-type decorative sheet comprising:
a temporary support;
an underlayer that is peelable from and disposed on one surface of the temporary support; and
a decorative layer that is disposed on the underlayer,
wherein the decorative layer includes at least one cholesteric liquid crystal layer,
the underlayer is a layer that is formed of a composition including a monomer having one or two polymerizable groups,
a water contact angle of the underlayer is 50° or more,
the monomer having one or two polymerizable groups has a cyclic structure,
a maximum reflectivity of an integral reflection spectrum in a wavelength range of 380 to 780 nm of the decorative layer is 50% or higher,
a specular reflectivity at a wavelength at which the decorative layer has the maximum reflectivity is 20% or lower, and
a half-width of an integral reflection spectrum of the decorative layer is 80 to 250 nm.

2. The transfer-type decorative sheet according to claim 1, wherein a content of the monomer having one or two polymerizable groups is 25 mass % or higher with respect to a total mass of monomers in the composition.

3. The transfer-type decorative sheet according to claim 1, wherein the cyclic structure is a structure represented by Formula (1), Formula (1)

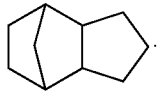

4. The transfer-type decorative sheet according to claim 1, wherein the cholesteric liquid crystal layer has a pitch gradient structure that is a structure in which a helical pitch changes in a thickness direction.

5. The transfer-type decorative sheet according to claim 1, wherein a thickness of the decorative layer is 5.0 µm or more.

6. A method of manufacturing the transfer-type decorative sheet according to claim 1, the method comprising:
 a step of forming the underlayer on the temporary support; and
 a step of forming the decorative layer on the underlayer.

7. The transfer-type decorative sheet according to claim 1, wherein the decorative layer is obtained by applying a liquid crystal composition including a liquid crystal compound and a chiral agent to the underlayer to obtain a coating film, aligning the liquid crystal compound in the coating film and curing the coating film.

8. The transfer-type decorative sheet according to claim 1, wherein the cholesteric liquid crystal layer has a flapping structure.

\* \* \* \* \*